US011812085B2

(12) United States Patent
Utile

(10) Patent No.: US 11,812,085 B2
(45) Date of Patent: Nov. 7, 2023

(54) LIVE VOICE AND MEDIA PUBLISHING AND DISTRIBUTION PLATFORM

(71) Applicant: attn.live LLC, San Juan, PR (US)

(72) Inventor: Ian Matthew Utile, Aptos, CA (US)

(73) Assignee: attn.live LLC, San Juan, PR (US)

( * ) Notice: Subject to any disclaimer, the term of this patent is extended or adjusted under 35 U.S.C. 154(b) by 15 days.

(21) Appl. No.: 17/508,456

(22) Filed: Oct. 22, 2021

(65) Prior Publication Data

US 2022/0182700 A1 Jun. 9, 2022

Related U.S. Application Data

(60) Provisional application No. 63/105,254, filed on Oct. 24, 2020.

(51) Int. Cl.
| | |
|---|---|
| *H04N 21/2743* | (2011.01) |
| *H04N 21/234* | (2011.01) |
| *H04N 21/258* | (2011.01) |
| *H04N 21/2187* | (2011.01) |

(52) U.S. Cl.
CPC ..... *H04N 21/2743* (2013.01); *H04N 21/2187* (2013.01); *H04N 21/23406* (2013.01); *H04N 21/25875* (2013.01)

(58) Field of Classification Search
CPC ........... H04N 21/2743; H04N 21/2187; H04N 21/23406; H04N 21/25875; G06Q 10/101; G06F 3/167
See application file for complete search history.

(56) References Cited

U.S. PATENT DOCUMENTS

| | | | | |
|---|---|---|---|---|
| 2019/0334957 | A1* | 10/2019 | Davis | H04L 65/403 |
| 2020/0005284 | A1* | 1/2020 | Vijayan | H04L 63/08 |
| 2020/0242105 | A1* | 7/2020 | Rich | H04L 67/1097 |
| 2020/0272713 | A1* | 8/2020 | Black | G06F 21/31 |
| 2021/0082470 | A1* | 3/2021 | Cramer | G06F 3/167 |

* cited by examiner

*Primary Examiner* — Alazar Tilahun
(74) *Attorney, Agent, or Firm* — Cynthia S. Lamon; Lamon Patent Services

(57) ABSTRACT

A network based media distribution platform includes a server connected to the network, the server including at least one data repository, and a non-transitory medium with a set of machine readable instructions executable therefrom coupled to the server, the instructions causing the server to (a) receive media content from a creator using a media capture device or system to create and upload content, (b) buffer the content for distribution over the network to one or more creator channels accessible to consumers operating media playback devices or systems connected to consumer platform, (c) authenticate the media content to the content creator using at least token data, (d) register the media content and creator authentication data on a connected blockchain storing information in distributed ledger form, and (e) distribute the content to creator channel(s) accessible to the consumers operating the network-connected playback devices or systems connected to the consumer platforms.

20 Claims, 8 Drawing Sheets

LIVE VOICE AND MEDIA PUBLISHING AND DISTRIBUTION PLATFORM

CROSS-REFERENCE TO RELATED DOCUMENTS

The present invention claims priority to a U.S. provisional patent application Ser. No. 63/105,254 entitled "Decentralized Voice Tech Will Disrupt Centralized Interfaces", filed on Oct. 24, 2020, the disclosure of which is included in this specification at least by reference.

BACKGROUND OF THE INVENTION

1. Field of the Invention

The present invention is in the field of network media publishing and distribution and pertains particularly to methods and apparatus for creating, publishing, and secure distribution of live voice and media content and securing protection of and preserving integrity of the content and transaction records produced through interaction with the content.

2. Discussion of the State of the Art

The art of media publishing has evolved over the years since the advent of computer aided telephony including the well-known Internet network and connected sub-networks and network access points. One trend that has been an ongoing trend is live content streaming where a user creates content and streams the content to a distribution point or points in the network in near real time. End users who consume network-based content, including access of streaming content, may access and download free content and may purchase proprietary content for download and playback and delayed or near live streaming.

Voice technology is another tool that has been integrated into computer aided applications in telephony and later Internet-based applications. Voice recognition platforms including Amazon Alexa, Apple Ski, are among other platforms that include end-user devices that perform tasks or enable functions through the user's voice. Similarly, computer appliances used for communications may include voice recognition technology that may be thought of as a natural voice technology that does not require templates to operate. In current art there are voice interfaces that enable a user to write content, navigate software applications and interfaces to make purchases, perform digital tasks, etc.

One negative issue with media content integrity has been the ability of hackers using editing tools to modify content or replace content with unauthorized content and then have that unauthorized content be distributed to end users for viewing, disrupting the platform used by the creator of the content. Another negative issue with media content integrity is unauthorized use of or distribution of the content against the wishes of a content author or agents of the author. Audio content, such as music content, may be pirated and downloaded to users obfuscating the license or purchasing requirements to access the content. While there are technologies available to regulate content and restrict or eliminate the ability to skirt download requirements or streaming requirements associated with the content distribution, they are often not effective enough against some hackers that have access to more sophisticated tools.

Another negative issue with distributing media content in general is related to platform propriety and media content presentation capability. For example, a media content produced on a particular platform may not be compatible with another platform for dissemination of the media requiring a special viewer or an extension for the end user. This can cause quality discrepancies in the video and audio content between the original content produced and the end content being disseminated.

Therefore, what is clearly needed is a live media publishing and distribution platform for enabling live creation, publishing, distribution, content ownership verification, and transaction accounting of a creator's media content.

BRIEF SUMMARY OF THE INVENTION

According to an embodiment of the present invention, a network based media distribution platform is provided comprising a server connected to the network, the server having access to at least one data repository, and a non-transitory medium with a set of machine readable instructions written thereon and executable there from coupled to the server, the instructions executed cause the server to (a) receive media content from a creator using a head end media capture device or system to create and upload the content, (b) buffer the received media content for preparation to distribute over the network to one or more creator domain channels accessible to consumers operating network-connected media playback devices or systems connected to one or more than one consumer platform, (c) authenticate the received media content to the content creator using at least token data, (d) register the received media content, authenticated to the creator on a network connected blockchain network, storing information in distributed ledger form, and (e) distribute the media content to the one or more creator channels accessible to the consumers operating the network-connected media playback devices or systems connected to the one or more consumer platforms.

In one embodiment, in (a) the media content is a live audio stream authored by the creator. In one embodiment, in (a) the media content is a podcast. In one embodiment, in (a) the media content is a video with audio. In one embodiment, in (a) the media content is curated, pre recorded content. In one embodiment, in (b) preparation for distribution includes voice language translation. In one embodiment, in (a) the head end media capture device or system is a smart home tech device capable of natural language interaction with the creator. In another embodiment, in (a) the head end media capture device or system is a PA system connected to a studio recording system. In one embodiment, in (b) the media playback devices or systems are smart home tech devices capable of natural language interaction with the consumers.

In one embodiment, in (b) preparation for distribution includes consumer platform oriented media content formatting. In one embodiment, in (c) the token data includes non fungible token (NFT) data and meta data describing the media content. In one embodiment, in (b) creator channels include social media accounts and messaging accounts. In the NFT embodiment, the NFT data includes definitions of transaction types available to consumers transacting relative to the NFT media content.

In one embodiment of the present invention, the set of machine readable instructions further cause the server to (f) access consumer transaction activity records relevant to the distributed media content for a creator, the transactions archived in ledger form on the blockchain network. In this embodiment, transaction activity records are accessible and made available to creators for view and download through a thin client application executed on one or more computing appliances owned by the creator. In one embodiment, in (e) the network-connected media playback devices or systems connected to the one or more consumer platforms is a computing appliance with a display and an input interface. In one embodiment, in (e) the network-connected media playback devices or systems connected to the one or more consumer platforms is one or more speakers wirelessly connected to a computing appliance with a display and an input interface.

In the NFT embodiment, in (c) NFT data and meta data is embedded into file or frame data at intervals over the length of the playback of the media content. In one embodiment, in (e) the media content is broadcast live to one or more channels available to an audience of consumers. In the NFT embodiment, in (d) information includes NFT data, meta data, creator authentication data, and transaction data.

DETAILED DESCRIPTION OF THE INVENTION

In various embodiments described in enabling detail herein, the inventor provides a unique system for voice activated capturing and streaming and consumption of live audio/video/imagery and for enabling tracking of ownership of the audio/video/imagery and monetization relative to consumer options and creator model. The present invention is described using the following examples, which may describe more than one relevant embodiment falling within the scope of the invention.

Figure 1:
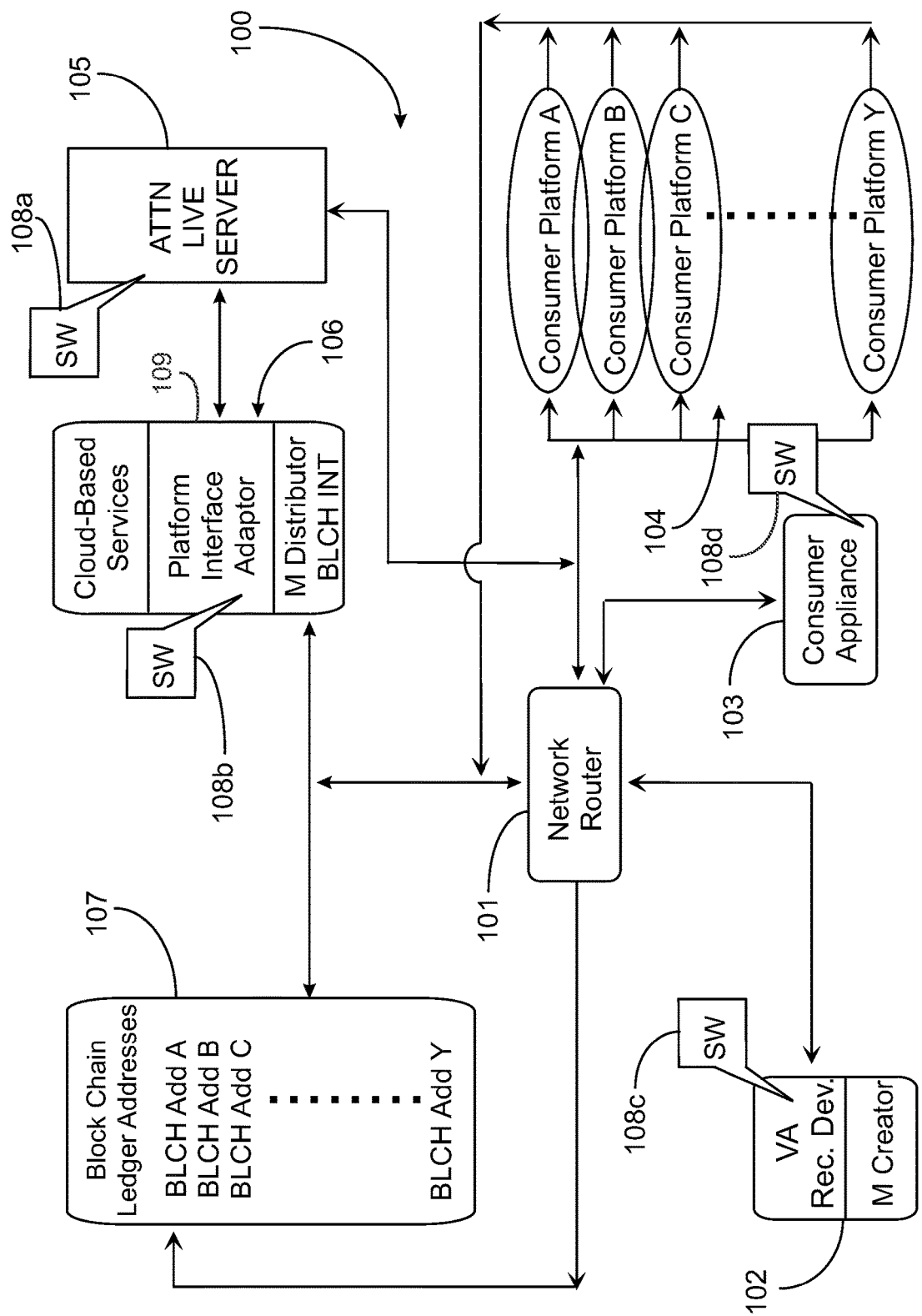
FIG. 1 is an architectural overview of a publishing network for live voice activated media creation and streaming according to an embodiment of the present invention.

FIG. 1 is an architectural overview of a publishing network 100 for live voice activated media creation and streaming according to an embodiment of the present invention. Network 100 is represented logically herein by the depiction of various connected network nodes and domains which may rely on an Internet network and various sub networks and connected networks for interaction and data processing and updating data stores. Network 100 may be described as an Internet network interconnection one or more transaction networks with one or more media consumption platforms.

Network 100 includes a block representation of a network router 101. Network router 101 logically represents any access data point and or routing point on the network as a whole including Internet services providers (ISPs), edge routers, network bridges, and other switch, relay, and data routing facilities. Network 100 includes a media creator 102 represented herein as operating at least one media recording device capable of functioning as a live head end device connected to network 100 through network router 101. Media creator 102 may represent any type of artist or technical user that may create media content for upload and publishing over the network to end devices and platforms. Examples might include entertainers, pod casters, video artists, photography enthusiasts, musicians etc. Likewise media creator 102 may be an individual, a team of individuals, a corporation, or any group of individuals under contract for creating media content.

Media creator 102 may use a variety of or a combination of media/audio/imagery capture devices to create and upload media for publishing including broadcast audio in real time through any iOS, Android, or Windows (computer, tablet, smart phone, wearable) device while providing content creators with a one of a kind NFT (ERC-721) token(s) with automated monetization and proof of ownership on a block-chain distributed ledger with the transactional to trade, license or sell their content in the NFT blockchain marketplace.

Media creator 102 may use voice activated network-connected devices such as smart home devices like Amazon Alexa, Microsoft Cortana, Google Assistant, Samsung Bixby, SoundHound, and Apple Siri in content creation. More than one capture device may be used in concert with connected or networked devices including video cameras, still image cameras, audio recording devices and or systems such as a PA system and connected studio recording system.

Media creator 102 has connection to network 100 through a sub network or a connected carrier network (not illustrated but assumed present), through network router 101, and over network 100 to a sever node 105 connected to network 100. Server 105 represents a domain of a service provider that may provide the platform and service of the present invention to clients like media creator 102. Server 105 is labeled ATTN Live server referencing a network platform that caters to voice/audio/imagery media creators and publishers like media creator 102. In this example, media creator 102 is a subscriber to a service provided that enables the creator to create, distribute, and monetize original creations intended for public consumption. Server 105 represents a provider domain adapted to facilitate goals for clients seeking a way to create and distribute content in a way that protects the creator's content and tracks transactions relative to that content.

Media creator 102 may, for example, visit server 105 and sign up for services becoming a client of the platform service. Server 105 may host a software (SW) 108a representing a parent SW application adapted to start and manage user accounts, maintain access to updated history of account activity, and provide data results and general feedback for review. In a preferred embodiment, media creator 102 may, in the process of registering as a service client at server 105, download a software (SW) client application 108c represented herein as a child application to parent application 108a hosted on server 105. Client application 108c may be a natural voice activated application that facilitates the process of creating and publishing media and communicating with the parent application and other sister applications it is designed to communicate and cooperate with over network 100.

In one embodiment, provider domain server 105 has network access to cloud-based services server 106. Server 106 represents cloud-based media relevant data processing and data storage services as well as media content registration services and media distribution and management services. Server 106 hosts a software (SW) application 108*b*, a sister application to client application 108*c*, both children applications to parent application 108*a* running on server 105. SW 108*b* may be, among other tasks, adapted in part as a platform interface adapter 109 generally related to conditioning media for distribution over and consumption on varied consumer platforms like consumer platforms 104.

Consumer platforms 104 may represent various media platforms through which consumers can disseminate media. Consumer platforms 104 include consumer platform A through consumer platform Y representing a number of platforms operated by other service providers considered participating entities or domains bridging the source of media to the consumer of the media. Consumer platforms 104 may include recognizable social media platforms like Youtube, Facebook, Twitter, Instagram, Snapchat, TikTok, Zoom, and LinkedIn. Platforms may include integration with smart home devices such as Amazon Alexa, Microsoft Cortana, Google Assistant, Samsung Bixby, SoundHound, Apple Siri and others.

Consumer platforms may include podcast platforms such as Spotify, iTunes, Soundcloud, Stitcher, and Google Podcasts. Platforms may include telephone conference platforms, and Zoom meeting platforms in business. There are many different head-end to destination network routing paths and any platform that may broadcast or stream the creator's content may be a potential channel that may be configured for a creator.

A consumer appliance 103 has connection to network 100 through network router 101 and may represent any consumer using any of consumer platforms 104 to receive the content from a creator like media creator 102. Consumer appliance 103 may be any of the above-mentioned smart home devices, or any hand held appliance having network browsing capability, a display, an audio system, and a user interface. In one embodiment, consumer appliance 103 may include a thin client application 108*d* downloaded and installed on the appliance that may be voice activated to aid the consumer in navigating content and completing secure transactions relative to the creator's content. In this case application 108*d* may be accessed from server 105 or from an application store. SW 108*d* is not required for a consumer like consumer 103 to practice the invention, for example, consuming media and transacting with the creator content or to receive the creator content. However, a natural voice activated SW client may improve the consumer's experience.

Cloud sever 106 includes a blockchain interface (BLCH INT) for securing non fungible tokens (NFT ERC-721 tokens) on behalf of creators of media content like media creator 102. NFTs secure the creator's content on a blockchain network distributed ledger system. Creator NFTs may include definitions of available consumer transactions relating to content. The blockchain network supports blockchain market digital transactions and the service of one or more creator revenue accounts associated with NFT transactions initiated by consumers like consumer 103. A blockchain network is represented logically herein by a blockchain server 107. Blockchain server 107 receives and records NFT transaction data for media creators like media creator 102 and stores data in a distributed ledger system as is known the art for decentralized blockchain data storage.

In one embodiment, media creator 102 is a subscriber with a service accessible through platform server 105 aided by SW 108*a*. In one embodiment, creator 102 uses a thin client application 108*c* to simplify access to services and to organize and interact with services. The creator may establish an account with the service at server 105 through the application 108*c* providing identification and password information for logging into the service.

Once creator 102 is registered with the content publishing service and has set up a NFT contract for registering content on the blockchain network for transaction-based monetization, the creator may go live and create content that is live streamed to desired consumer platforms 104. Server 105 may function as a proxy server for the purpose of data logging, authentication, and account management, among other tasks. However, server 105 may redirect to cloud server 106 for media processing and distribution over the network to consumer platforms.

In one embodiment, media creator 102 uploads content, as it is created, through router 101 to server 106 having been redirected to the server by server 105 functioning as a proxy. Part of the information known at server 106 at the time of receipt of media from a creator is the creator information, including authentication data, contract data, creator's media platform, preferred consumer platforms (media destinations), and NFT contract data. SW 108*b* may buffer uploaded content and process the content, for example, preparing the content for streaming to other platforms, and embedding the content with NFT token data (if required) so that the content may be registered with blockchain server 107 as it is or just before it is being streamed to live consumer platforms 104.

In a preferred embodiment, a live streaming platform with content tracing for monetization is created whereby a media creator such as creator 102 may live stream through a smart home device using voice as input and whereby consumers may listen to the content and initiate one or more transactions using voice as input. The platform content distribution process includes adapting the creator's content to be received on selected platforms using SW generic to those platforms, or using a thin consumer application 108*d* on any device of choice used to consume media content. In one embodiment, consumers may subscribe to creators and may, aided by SW 108*d*, make transactions through a device accepting at least voice input commands from the consumer, for example to purchase, share, license, and or to contract with a creator.

It will be noted herein that video/audio content may be consumed by network-capable appliances or smart devices having the appropriate display and audio features to function as media playback devices or media streaming devices. It is also noted herein that two appliances or devices may consume media, for example, a video display device, connected to a sound system, for example, an entertainment system connected to the network. Dedicated audio playback devices capable of wireless activation like Bluetooth speakers and the like may be included in appliances connected to a network-connected content receiving device used by the consumer.

Figure 2:
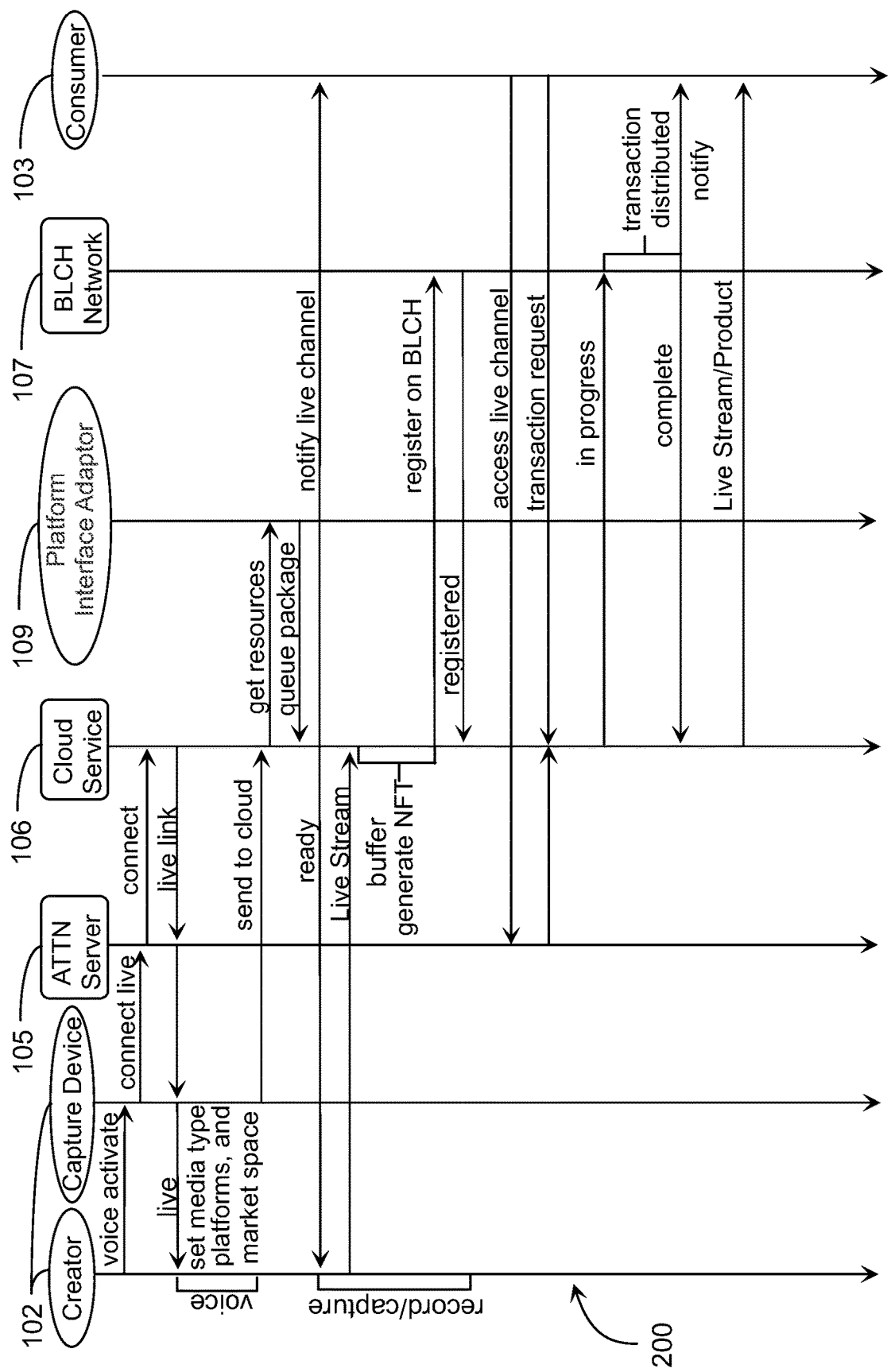
FIG. 2 is a sequence diagram depicting interaction between nodes involved in publishing created content over the network of FIG. 1.

FIG. 2 is a sequence diagram 200 depicting interaction between nodes involved in publishing created content over network 100 of FIG. 1. Sequence diagram 200 depicts an example of practice of the present invention in one embodiment. The nodes in this example are synonymous with the referenced nodes in FIG. 1 and retain the same element numbers. Media creator 102 (creator/capture device) may connect live to ATTN Live server 105 using a natural language voice SW installed on the capture device or group of connected devices at least one of which is network capable and may open an automated connection with server 105.

Server 105, functioning as a proxy server, may open a server connection with cloud server 106 and establish a live link between the cloud server and creator 102. In one embodiment, creator 102 using voice commands, may confirm an existing or default set of streaming metrics, or may establish a new set of metrics depending on the preferences of the content creator. Metrics include media type, creator's platform, device used to capture and to upload media, destination channels (platforms) to receive the live stream, and whether the creator requires NFT for the content, and if so which NFT model of more than one possible model that may be on file for a creator. In one embodiment, SW 108*c* on a creator's device prompts a creator using synthesized voice to confirm metrics or set new metrics. The fact of natural voice enablement does not obfuscate a creator typing input through a displayed application using touch screen or keyboard or keypad input if desired or using both voice and typed input to convey metrics to the cloud server.

When cloud server 106 receives the data from the creator it uses the information to obtain resources from a connected data repository adapted to store consumer platform resources 109 including conversion software, translation software, media formatting, extensions, OS adaptation extensions, etc. In one embodiment, specific consumer channels are created for a content creator by default for audio content not limited to popular platforms like Amazon, Google, Cortana, Bixby Capsule, or Siri Shortcut. Video/Audio content may be streamed on social media platforms like Facebook, Instagram, Youtube, Twitter, Snapchat, TikTok, or LinkedIn.

Platform interface adapter 109, queue a package for processing and distributing the content from the creator as the content is streamed. Server 106 may notify the creator that the server is ready to receive content from the creator operating as a head end. At the same time, subscribers, fans, followers, may be notified of the live stream, which may be an audio notification or a visual notification on a display of the connected device. The creator may begin live streaming using the connected capture/recording device or system (connected devices) when prompted. The live stream is uploaded to server 106 for processing.

The live stream may be buffered upon receipt at server 106. Server 106 aided by SW 108*b* may process the stream for NFT blockchain registration by embedding NFT token data and creator identification code (digital signature data or other unique ID) and a blockchain hyperlink into content frame data of the stream. Cloud server 106 registers the content in association with the creator and unique NFT data on blockchain server 107 so that transactions may be received and recorded. Blockchain server may confirm registration before the stream is released from buffer and is distributed to consumer platforms. A consumer 103 may, in one embodiment, also be a subscriber to server 105 and may open a specific creator's channel using a smart home device, or other network capable appliance. A creator's channel may play a content feed of archived material or otherwise looped content until the creator goes live, then the live content may be broadcast over the creator's channel replacing the looped feed.

Server 105 may function as a proxy server and redirect to server 106 to connect the consumer to the creator's channel (platform specific) to access the live stream, which may be a podcast, a music performance, a lecture, a how to video, or any other live content. In one embodiment, the consumer 103 may initiate a transaction before receiving the stream the transaction to pay for the stream. The transaction may be carried out on the blockchain network using a wallet account. The transaction type may vary according to the creator's NFT contract for that content.

A transaction might be initiated to receive the stream, to purchase a product or service associated with the stream, license the content for redistribution on another platform, license the content for resale, purchase ownership of the original content, etc. A transaction is registered on block chain server 107 under the creator's domain or the ATTN-.LIVE domain and the NFT contract and stored in association with the registered content in distributed fashion. Once a transaction is complete on the blockchain server, the consumer and the cloud server may be notified and the consumer may download the live stream. In this example, the consumer completes a transaction to get the stream and knows about the stream through notification. In other embodiments, the consumer may receive a stream from the creator and may interact with the stream to initiate a transaction, or may transact after the stream is consumed.

Transactional capabilities are limited in part of the NFT category of the content and transaction types covered by the NFT. It may be noted herein that a consumer may also be allowed to initiate a transaction related to creator content that is not live but part of a creator's channel the consumer is monitoring or following. In one embodiment, a transaction related to a creator's media content may be initiated as part of an interaction with ad content embedded in a portion or portions of the media file.

In a very simple embodiment, a creator may create content using a smart home audio device like Apple Siri and a consumer may use a same or different smart home device, for example Alexa to consume the content and to transact from. Natural voice may be used at both ends to accomplish media creation and publishing for distribution, and for accessing distributed content, consuming the content, and transacting relative to that content. Distribution of processed content may involve one channel or several channels. A creator may use a PA recording/sound system and a video camera to produce live audio/video content as long as the PA equipment includes a router/modem adapted to upload the content to the service platform.

Figure 3:
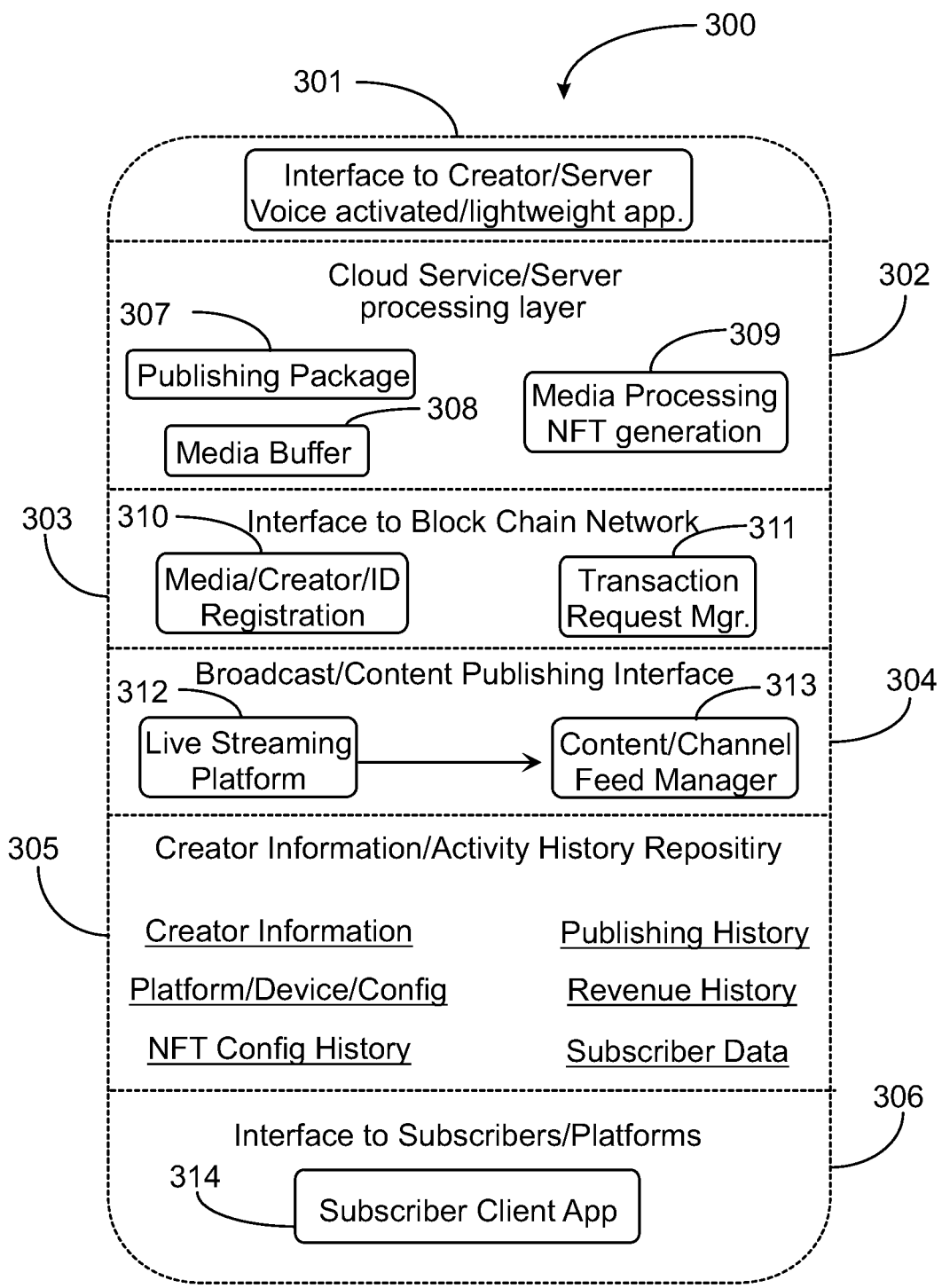
FIG. 3 is a block diagram depicting software layers for processing and publishing created media content.

FIG. 3 is a block diagram depicting software layers 300 for processing and publishing created media content. Software layers 300 are grouped logically in this block diagram however, software layers 300 may be distributed over more than one cable connected processor or network-connected processor without departing from the spirit and scope of the present invention. Software layers 300 may be analogous to software 108(*a-d*). Software layers 300 may be referred to as software 300. In one embodiment, software 300 includes an interface layer 301 for network communication between the creator and the cloud server application.

A thin client application may be provided in some cases (device appropriate) to one or more creator appliances or smart devices. The creator and server may interact using natural voice recognition. An application for an appliance having a display may include data presenting activity history, revenue history, account history, and other information helpful to the creator in the process of monetization of content.

Software 300 includes a server processing layer (cloud services layer) 302. Layer 302 may include processing to create a publishing package 307 for creators content. A set of publishing instructions may include the consumer platform data and creator channel data for live content. Layer 302 may include a media buffer 308 for receiving and buffering creator content while processing content. Layer 302 may include a processor module 309 for generating a unique NFT for the creator content and embedding NFT meta data into the file content before streaming the content to consumer platforms.

Software 300 includes a blockchain interface layer 303 for adding new NFT content associated with the creator's authentic code into the blockchain network. Layer 303 may include a registration processor module 310 dedicated to registering the creator's media content and NFT data on the blockchain network. Blockchain interface layer 303 may also include a transaction request manager processing module for monitoring transactions associated with creator content represented on the blockchain network. A distributed ledger system is used on the blockchain network to record all of the transactions associated with content NFTs of creators.

Software 300 includes a content streaming/broadcast/publishing interface layer 304. Layer 304 may include a live streaming platform distribution module 312. Layer 304 may also include a content channel feed management module 313. Layer 304 includes streaming content, broadcasting content, routing content over connected networks such as computer aided telephony networks, local area networks (LAN), and wide area networks (WAN) connected to the broader network.

Feed management module 313 may be dedicated to controlling a switch for a creator's channel wherein the switch may interrupt a feed loop on a creator's channel to publish a live stream from the creator. After the live stream airs, the channel may be switched right back to the looped content. Looped content may be former streams that were announced live and then added to the loop after airing. In one embodiment, a creator's content may be translated from one language into another language as part of the media content processing before the end stream. In still another embodiment, a media content muxing process may be performed by artificial intelligence (AI) processing like limited mux of audio content with an image stream or slide show. Creator channels may be adapted to shake hands with the consumer platforms they are created for and may differ from one another in how media is packed, unpacked, and presented and consumed on the channel. Consumer initiated transactions are directed by NFT hyperlink to the service blockchain interface for transaction processing and distribution of the transaction records over the blockchain network.

Software 300 may include a service-level historical activity layer 305 including access over cable or network to at least one data repository adapted to archive creator information including publishing history, platform/device configuration data, NFT revenue history, NFT configuration state and history, and subscriber data, which may include access to transaction history. In one embodiment, artificial intelligence is used to present focused statistics on revenue and marketing and may suggest new approaches, publication channels, live content frequency ratios, etc. Such data may be available to creators through a thin client application on one or more computing appliances.

Software 300 includes an interface layer 306 to subscriber platforms including a module for enabling subscribers to become members of the live streaming platform described herein. Subscribers may download a thin client application aiding them in accessing creator's on the network and in transacting with the creator NFTs or in general with creator products or services offered through content or otherwise associated with it.

Figure 4:
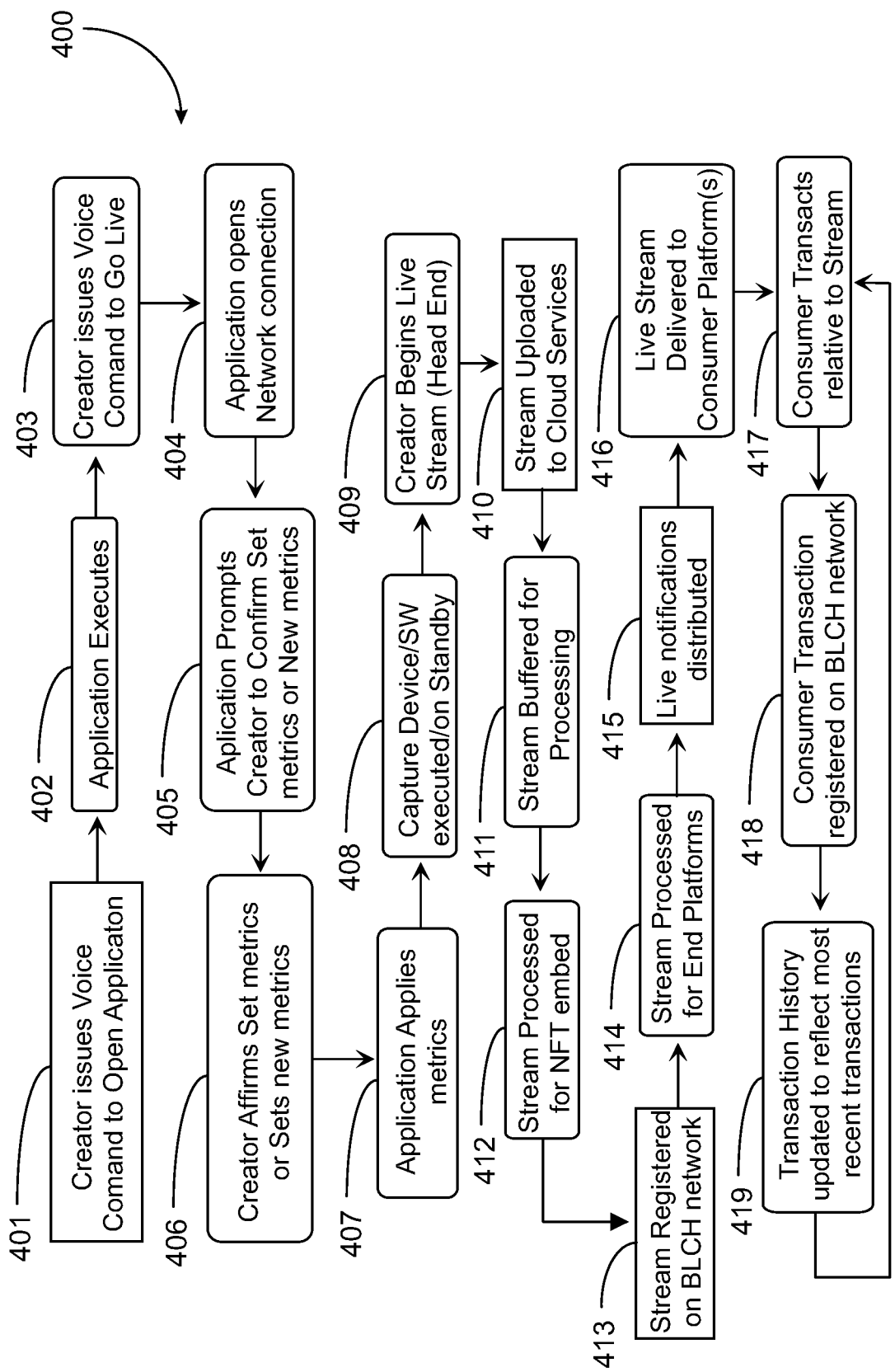
FIG. 4 is a process flow chart depicting steps for live stream monetization.

FIG. 4 is a process flow chart 400 depicting steps for live stream monetization. It is assumed in this process flow that a creator is a client of the live streaming platform and is ready to contribute live content. At step 401, the creator may issue a voice command to a device capable of understanding natural language commands to open live, a command to execute the live streaming application. The application executes at step 402. At step 403, the creator may issue a command to go live. Such a command represents the creator's intent to live stream to one or more consumer platforms for which a channel may be created for creator content and wherein the content is searchable by content consumers engaging that consumer platform.

A consumer platform may also include synchronous messaging channels, social media channels, and digital conferencing channels. At step 404, the executed application may establish a network connection to the service. At step 405, the application may voice prompt the creator asking the creator to confirm a default set of metrics (publishing package) or change metrics to another set or provide new metrics. Content providers may stick with a set metric for successive new content sessions or they may have different metrics for different content types or media formats. Set metrics generally involve the process of formatting the media content for the platform or platforms it is made available on.

The creator may confirm or set new metrics using voice command at step 406 confirming to the service the correct publishing metrics for the content to be contributed. A creator may have one or more types of NFTs for content that may include various financial options for consumers including the purchase of the NFT, licensing of the content under the NFT, etc. NFT data may include all of the transaction types enabled according to the NFT contract. The application may apply the metrics at step 407 and the application associates the correct NFT contract to the creator's content before the content is created. In this way content rendering processing and distribution is carried out according to NFT contract data.

At step 408, the creator's leveraged device or system software for recording, video capture, etc. executes and remains on standby for the creator to begin a session. For example, the creator may use a smart home device to record and upload an audio podcast or some other audio content. In another example, the creator may use a hand held computing appliance mounted on a tripod to record content using video and audio. In another embodiment, a studio recording session with or without video may be created live and uploaded. In still other embodiments, video production camera and audio microphone equipment typical of interview sessions might be used. There are many possibilities.

At step 409, the creator may begin a live recording session. In one embodiment, the server may prompt the creator with a countdown. The creator may be enabled to cut a production and redo the session. In this embodiment, a creator may be able to perform edits to content locally before uploading content. For example, a creator may curate content for 24/7 air on one or more creator channels with the curated content interrupted for a planned live stream. The content may be uploaded from the head end to the processing server as the creator is streaming live at step 410.

At step 411, the stream may be buffered at the server and processed for publication, platform conformance, and NFT ownership and subsequent monetization from transactions. At step 412, the stream may be processed for NFT coding embed involving authenticating the ownership of the content using NFT code and descriptive meta data inserted into the digital content. The stream may be registered on the blockchain network at step 413 before being streamed out to consumer platforms protecting the integrity of the content, the ownership of the content and tracking transactional activity related to the content producing a transaction record and recording a revenue stream related to that creator and content.

At step 414, the live stream may be formatted or otherwise processed for conformance to one or more consumer platforms listed in the metrics as destination platforms or end points. In one embodiment, notifications may be sent out to known followers or subscribers of the creator alerting them to the pending live stream available on the creator's channel or channels. In one embodiment, a consumer may use a smart home device that may prompt the consumer with a voice notification by schedule or randomly when the creator's channel is ready to stream the content, the content played or not at the consumer response.

In one embodiment, the consumer is using a smart mobile device installed in a vehicle wherein vocal commands and responses to prompts from the consumer control what content is accessed through the network-connected system such as an XM system or Sirus radio, for example. At step 416, the live stream is delivered to consumer platforms and consumer device end nodes, which may include wirelessly connected peripheral nodes set up as speaker nodes, for example.

On the consumer side of the platform, a consumer may request to transact at step 417 relative to the stream and stream content. The consumer is limited to the types of transactions allowed under the creator's NFT associated with the content. Consumer transaction requests are driven by NFT hyperlink to a secure digital transaction platform connected to the blockchain network at step 418. Completed transactions are recorded in distributed ledger form on the blockchain network under the creator, content and NFT contract covering the content at step 419 creating transaction history and digital account revenue totals for the creator. Currency may be any accepted digital form of payment such as from a digital wallet.

Figure 5:
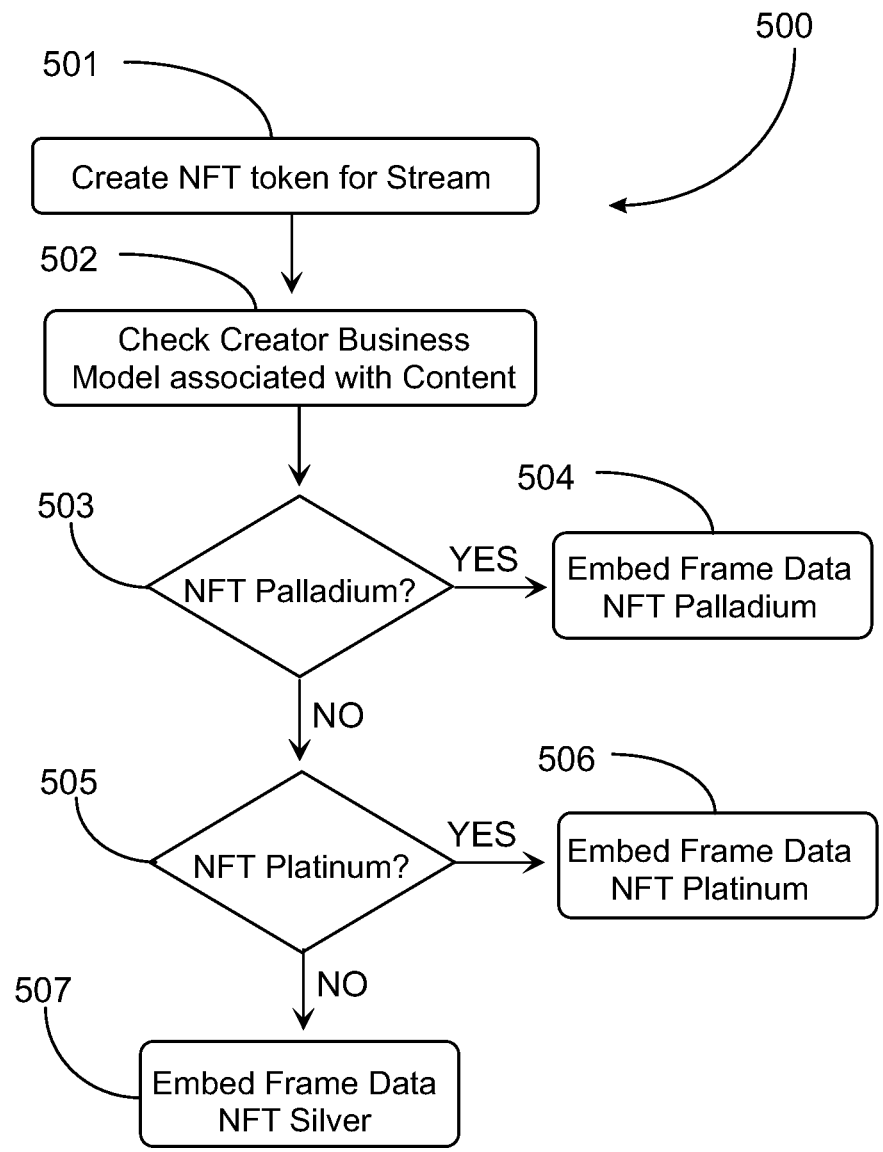
FIG. 5 is a process flow chart depicting steps for customizing an assigned NFT.

FIG. 5 is a process flow chart 500 depicting steps for customizing a creator assigned NFT. In this embodiment there are three basic levels of NFT contracts that may be created from basic NFT token data assigned to the creator for NFT generation. At step 501, an NFT unique token may be created for the live stream media. At step 502, the server NFT module may check the creator business model associated with the type of content the creator has authored. NFTs may be customized for content and level of transact-ability afforded to purveyors of the content. At step 503, it may be determined first if the highest level NFT model, in this example palladium is appropriate for the content and objectives of the creator.

If at step 503 it is determined that a palladium NFT token is appropriate the token data, creator authentication data (digital signature), and content and transactional meta data may be embedded into content files or frames at step 504 before registering the NFT and content on the blockchain network under the creator's domain or space. If at step 503, the determination is that palladium is not appropriate, the next level down NFT platinum contract is evaluated at step 505 to determine if it is appropriate for the creator's content and publishing package data. If at step 505 it is determined that platinum NFT contract is appropriate for the creator's content and other metrics than the NFT platinum token data, creator authentication data, and content and transactional meta data maybe embedded into the media files at step 506.

If at step 505 it is determined that platinum NFT is not appropriate, then the system defaults to the next lower NFT level or silver NFT token data, creator authentication data, and content and transactional meta data, which may be embedded into the media files or frames at step 507. The goal of the NFT token is to identify the media content as that of the author and owner of the content and to uniquely represent at least portions of the content and support one or more transaction scenarios available to potential consumers and current consumers who subscribe to content, or otherwise follow content authored by specific creators. NFT levels may be inspired by transactional models associated with successive levels of business contractual relationships, ability to perform specific types of contractual transactions like licensing, reselling, redistribution, creating copies, and so on.

It may be noted by one with skill in the art of NFT minting that other NFT creation and development criteria may be practiced without departing from the spirit and scope of the present invention. In the above example there are three basic NFT levels Palladium NFT implying a rarest mint with commercial utility rights, then a next lower level Platinum implying non-commercial utility rights, and then silver implying no utility rights. However, other tiers and platforms or differentiation models may be used in the process of defining and minting NFTs for creators.

In one embodiment, NFTs may be minted on demand whereby a creator makes a piece of content and once the content is marketed in the NFT market, every time a transaction occurs due to a consumer purchasing the content, a new NFT token is created for that transaction. Further there are NFT creation platforms like OpenSea, Rareable, and NiftyGateway, that offer an option whereby an NFT token is only minted on the blockchain network after it is purchased obfuscating unnecessary minting gas fees.

Figure 6:
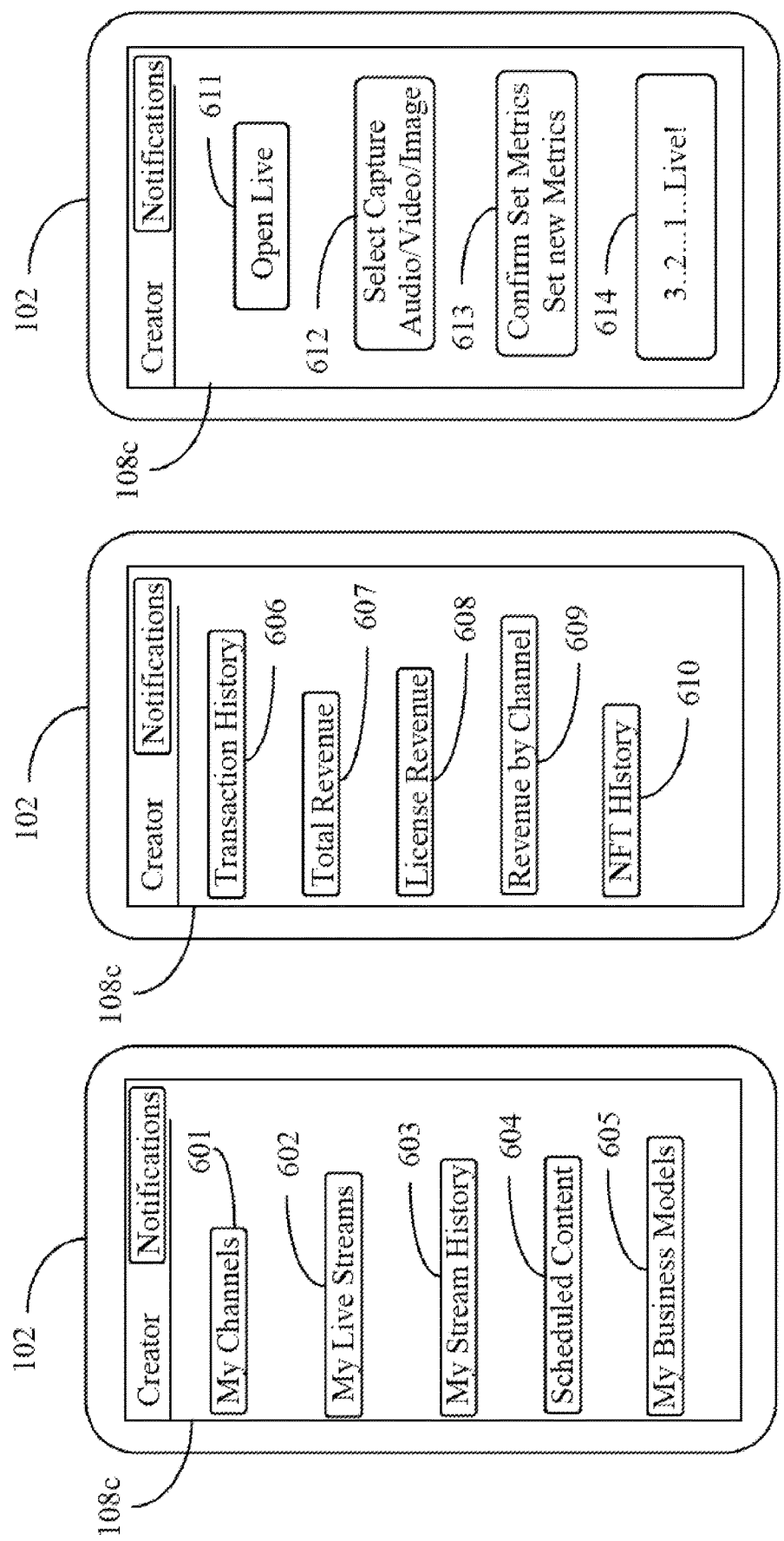
FIG. 6A is an elevation view of a computing device displaying a client application screen shot.
FIG. 6B is an elevation view of the computing device of FIG. 6A displaying another client application screen shot.
FIG. 6C is an elevation view of the computing device of FIG. 6A displaying another client application screen shot.

FIG. 6A is an elevation view of a computing device 102 displaying a client application screen shot. In this embodiment, a thin client application (108c, FIG. 1) may be downloaded to a creator's smart phone, laptop computer, notebook, or other network capable device having display and input mechanics. A creator may use appliance or device 102 to create content for upload in one embodiment. In another embodiment the creator may use appliance 102 as a proxy device that is networked wirelessly to other equipment used to capture video and audio.

In this embodiment, device 102 includes the thin client application executing on the smart phone in this case. Application 108c may be downloaded and installed and may be used to connect to the live platform service to initiate content creation and upload and to access data organized for the creator. In this screen shot, application 108c displays interactive options for navigation by the creator. A creator may browse and edit (ad, delete, modify) creator channels by clicking on my channels link 601. A creator may open my live streams link 602 to see the live streams created using the platform and may select streams to curate into 24/7 channel content that is presented on a creator's channel when the creator is not interrupting the feed to go live.

Other navigable links may include a link 603 to all of the creator streams and stream history such as when streams aired and what responses the streams received including transactional activity associated with the streams. It is noted that streams may include audio content and or video and image content and may include content that was not performed live. Other navigable links may include a link 604 to scheduled content including scheduled live content and a link 605 to browse and make edits to business models that may determine the level of NFT assignment to authored content. Application 108c may include a notifications bar and may be customized for the creator wherein the application may have permissions to execute other software applications on the device like messaging, video camera, still camera, audio recording, etc.

FIG. 6B is an elevation view of computing device 102 of FIG. 6A displaying another client application screen shot. Application 108c may include further navigable links for the creator to browse such as a transaction history link 606, a total revenue link 607, a license revenue link 608 subset of data in link 606, a link 608 to revenue by creator channel, a further subset of data 607. A navigable link to the creator's NFT contract history may also be provided allowing the creator to view data about the NFTs that have been assigned to authored content under the creator. It may be noted that application 108c may also be provided as a voice operated interface on a computing appliance with no display capability like a smart home device connected to the network. The creator may also operate a displayed application using voice only although physical interaction with the displayed version of the application on touch screen is possible.

FIG. 6C is an elevation view of computing device 102 of FIG. 6A displaying another client application screen shot. In this particular screen shot, application 108c displays a set of navigable links that may be interacted with to prepare and go live on the voice platform with live streaming capability. Link 611 may open ATTN Live in preparation for going live. Link 612 may enable the creator to select which live mode, audio, or audio/video, or audio with background image or slide shows of images, etc. are used. Link 613 may enable the creator to confirm default NFT metrics for a live event, or to create new metrics for the live event. Link 614 may start a countdown to live capture after other metrics are confirmed. For example, one type of live content might require purchase to consume while another live event may be intended to be free to the downloaded but cannot be redistributed or copied without paying a license fee per NFT contract.

In actual practice, a content creator may associate an NFT contractual category to content type that is authored repetitively using the same capture mechanics and equipment and software such that the system may make an NFT default prediction for a live event that the creator may simply confirm. However, the creator may override default settings for different reasons such as raising fees, engaging in trade, changing NFT contract fundamentals like licensing rules, switching to another set of capture mechanics, software and equipment, and so on. In one embodiment, application 108c may be an audio interface that the creator having natural language commands and requests can execute and navigate using natural voice.

In one embodiment, a thin client application analogous to application 108d of FIG. 1 may be provided to a consumer who wishes to subscribe to creators using the live voice platform through a preferred consumer platform or platforms. Natural voice recognition may also be available at the consumer end. Subscribing consumers may receive periodic notifications when creators they follow have published new content curated or live. In one embodiment, consumers may opt to join the live platform as subscribers and may consume media and transact according to NFT metrics, and may themselves be authors of creators of content. In one embodiment, creators have channels in each consumer platform they use to reach an audience like a YouTube channel, a Microsoft Cortana channel, a LinkedIn page, a Facebook channel, etc.

Figure 7:
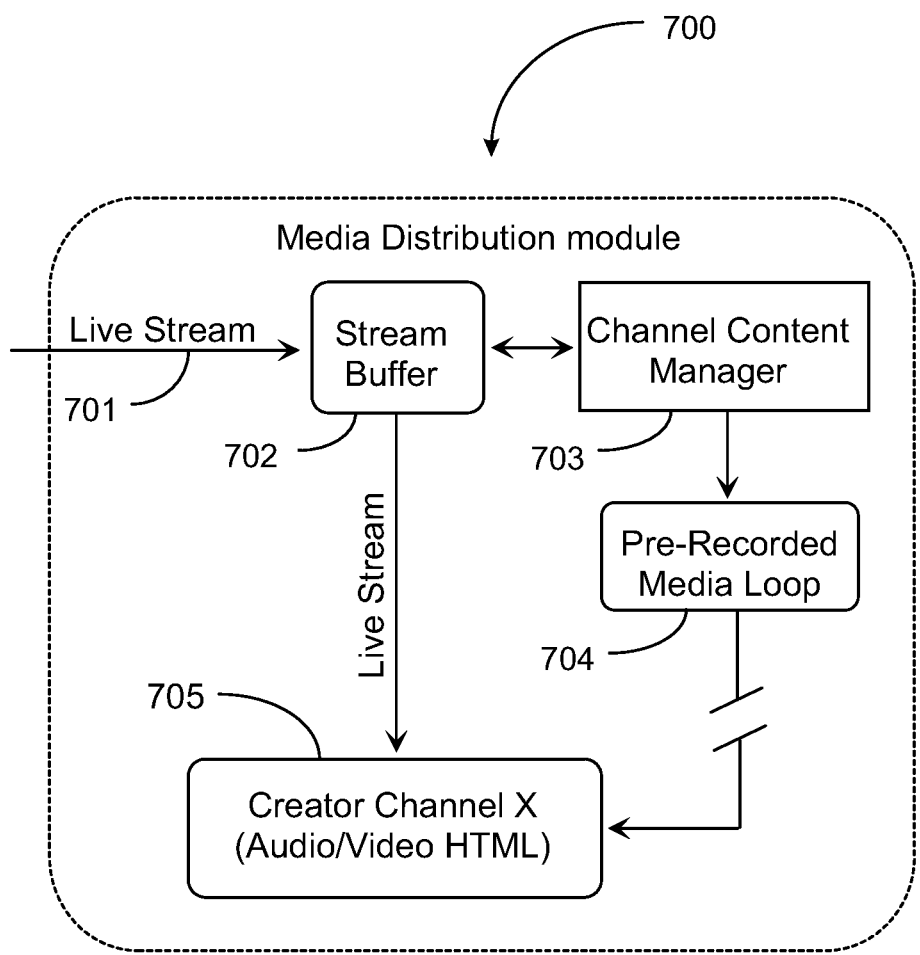
FIG. 7 is a block diagram depicting a media distribution module for switching between live content and a curated content.

FIG. 7 is a block diagram depicting a media distribution module 700 for switching between live content and curated content. Distribution module 700 may reside in a server in the cloud network like server 106 of FIG. 1 and may have control over one or more creator live stream channels distributed on consumer platforms. In one embodiment, media distribution module 700 may be distributed in the cloud network and may control created consumer channels on consumer platforms without departing from the spirit and scope of the present invention. A creator channel is a domain reserved on a consumer platform for playing curated content from the creator and live streams authored by the creator. Media distribution module 700 may include a stream buffer 702 for receiving a live stream 701 from a creator for distribution to one or more creator channels on consumer platforms.

Stream buffer 702 may be logically connected to a channel content management module 703 that may be adapted to turn on or turn off a prerecorded curated content feed 704 belonging to the creator that may be displayed 24/7 on a creator channel 705. In one embodiment, when channel content manager 703 recognizes a live feed 701 in stream buffer 702, it may determine the channel or channels that are destination points for the live stream (audio/video). The channel content manager may then switch off a curated content feed to the channel or channels and confirm the switch to the stream buffer stream the content onto the target channel(s).

A live stream that has played on the creator's channel may be added to the curated content by the creator. The creator may edit curated content by deleting content, adding content, reshuffling or reordering content in the feed presentation, and so on. For example, a music channel on Spotify or YouTube may loop creator music selections until a live original performance by the creator is set to be streamed to the channel. The content on the channel may not be viewable until the live stream has completed.

Figure 8:
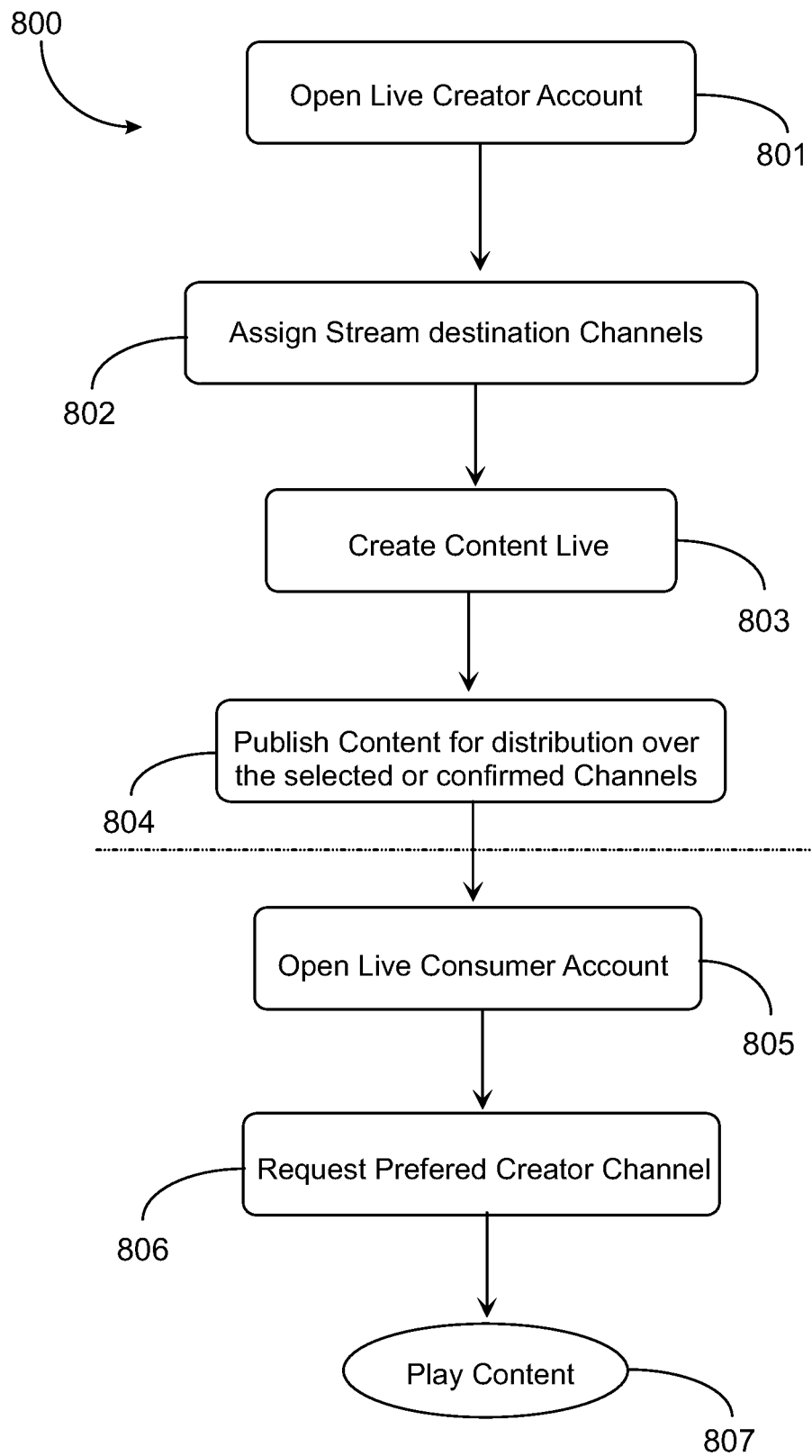
FIG. 8 is a process flow chart depicting steps for media creation and consumption on a consumer platform.

FIG. 8 is a process flow chart 800 depicting steps for media creation and consumption on a consumer platform. In a simple example, a creator may open a live creator account in preparation for live streaming at step 801. At step 802, the creator may confirm or reset destination channels for receiving the live stream. A destination channel is a domain on a consumer platform where users on that platform may consume media available on the platform.

At step 803, the creator may create or author content live. At step 804, the creator publishes (uploads live) the content for distribution to confirmed or selected channels on consumer platforms. It is noted herein that a creator may accomplish the publishing end tasks using natural voice commands and responses to verbal prompts including opening, confirming or setting new metrics for distribution, and launching a countdown to live recording. In one simple embodiment, the creator may use a smart home device or system to create and upload the content to the cloud server tasked with processing and distributing the content to consumer platforms.

On the consumer end, a consumer may in one embodiment, have a consumer account installed on one or more than one device or system capable of connecting to the network, a platform, and playing content for the consumer on the end device or system. In one embodiment, the consumer may use voice command at step 805, to open the live account. At step 806, the consumer may request a creator and channel using voice commands. At step 807, the consumer may play content from the creator channel.

In one embodiment, the media play back system is a smart home device and the application may offer voice prompts to the consumer including offering transaction opportunities to the consumer. In one embodiment, the application may be installed one a device having a display and input means whereby the consumer may browse and transact relative to the creator NFT authenticated content. A consumer may be a single person, a group of individuals connected by business or a company, or an individual promoting one or more creators by scheduling remote events, for example, wherein the content arrives and is played over a venue to an audience that may be live or remote. There are many possible applications for a live streaming platform with blockchain accounting and transacting services. Application fields may include remote and live music industry, podcast industry, remote and in person educational industry, intellectual property industry, groups that collaborate to create intellectual property, photography, artistry, political influence, stage performers, sports industry, and many other industries.

It will be apparent with skill in the art that the live streaming platform of the present invention may be provided using some or all the elements described herein. The arrangement of elements and functionality thereof relative to the live streaming platform of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A network based media distribution platform comprising:
 a server connected to the network, the server having access to at least one data repository; and
 a non-transitory medium with a set of machine readable instructions written thereon and executable therefrom coupled to the server, the instructions executed cause the server to;
 (a) receive media content from a creator using at least one of a head end media capture device and a system to create and upload the content;
 (b) buffer the media content for preparation to distribute over the network to at least one creator channel accessible to consumers;
 (c) authenticate the media content to the content creator according to a non-fungible token (NFT) created by the content creator and associated with the media content;
 (d) register the media content and the associated NFT authenticated to the creator on a network connected blockchain storing information in distributed ledger form; and
 (e) distribute the media content to the at least one creator channel accessible to the consumers as dictated by NFT data of the NFT, the consumers operating at least one of a network-connected media playback device and a network-connected system connected to at least one consumer platform.

2. The media distribution platform of claim 1, wherein in (a) the media content is a live audio stream authored by the creator.

3. The media distribution platform of claim 1, wherein in (a) the media content is a podcast.

4. The media distribution platform of claim 1, wherein in (a) the media content is a live video with audio.

5. The media distribution platform of claim 1, wherein in (a) the media content is curated prerecorded content.

6. The media distribution platform of claim 1, wherein in (b) preparation for distribution includes voice language translation.

7. The media distribution platform of claim 1, wherein in (a) the head end media capture device is a smart home tech device capable of natural language interaction with the creator.

8. The media distribution platform of claim 1, wherein in (a) the system to create and upload the content is a PA system connected to a studio recording system.

9. The media distribution platform of claim 1, wherein in (e) the network-connected media playback device is a smart home device capable of natural language interaction with the consumers.

10. The media distribution platform of claim 1, wherein in (b) preparation for distribution includes consumer platform oriented media content formatting.

11. The media distribution platform of claim 1, wherein the server also receives and distributes meta data describing the media content.

12. The media distribution platform of claim 1, wherein in (b) the at least one creator channel includes social media accounts and messaging accounts.

13. The media distribution platform of claim 1, wherein the server also receives and distributes definitions of transaction types available to consumers transacting relative to the media content.

14. The media distribution platform of claim 1, wherein the set of machine readable instructions further cause the server to (f) access consumer transaction activity records relevant to the distributed media content for a creator, the transactions archived in ledger form on the blockchain network.

15. The media distribution platform of claim 14, wherein transaction activity records are accessible and made available to creators for view and download through a thin client application executed on at least one computing appliance owned by the creator.

16. The media distribution platform of claim 1, wherein in (e) the at least one of a network-connected media playback device and a network-connected system connected to at least one consumer platform is a computing appliance with a display and an input interface.

17. The media distribution platform of claim 1, wherein in (e) the at least one of a network-connected media playback device and a network-connected system connected to at least one consumer platform is at least one speaker wirelessly connected to a computing appliance with a display and an input interface.

18. The media distribution platform of claim 11, wherein in (c) NFT data and meta data is embedded into at least one of file and frame data at intervals over the length of the playback of the media content.

19. The media distribution platform of claim 1, wherein in (e) the media content is broadcast live to at least one channel available to an audience of consumers.

20. The media distribution platform of claim 11, wherein in (d) information includes NFT data, meta data, creator authentication data, and transaction data.

\* \* \* \* \*